United States Patent [19]

Wessling et al.

[11] Patent Number: 4,806,439
[45] Date of Patent: Feb. 21, 1989

[54] TEMPORARY BARRIER LAYER IN BATTERIES

[75] Inventors: Ritchie A. Wessling; Jang-hi Im, both of Midland, Mich.

[73] Assignee: The Dow Chemical Company, Midland, Mich.

[21] Appl. No.: 152,125

[22] Filed: Feb. 4, 1988

[51] Int. Cl.⁴ ............................................. H01M 2/16
[52] U.S. Cl. ........................................ 429/48; 429/50; 429/118; 429/194; 429/249
[58] Field of Search ............... 429/110, 118, 194, 129, 429/130, 142, 145, 101, 50, 52, 48, 252, 247

[56] References Cited

U.S. PATENT DOCUMENTS

| | | | |
|---|---|---|---|
| 3,092,518 | 6/1963 | Cahoon et al. | 429/249 |
| 3,129,118 | 4/1964 | Wilke et al. | 429/119 |
| 4,278,741 | 7/1981 | Kalnoki-Kis | 429/48 |
| 4,594,299 | 6/1986 | Cook et al. | 429/129 |
| 4,608,753 | 2/1986 | Fleischer | 429/48 X |
| 4,615,961 | 10/1986 | Park et al. | 429/218 |
| 4,629,666 | 12/1986 | Schlaikjer | 429/194 |
| 4,684,583 | 8/1987 | Klinedinst | 429/48 |

Primary Examiner—Anthony Skapars
Attorney, Agent, or Firm—Price, Heneveld, Cooper, DeWitt & Litton

[57] ABSTRACT

There is disclosed a separator medium for fluid-activated primary electrochemical battery cells of the reserve type. The separator medium comprises a thin, substantially impermeable film of a Lewis base polymer which is soluble in the activating electrolyte solution.

41 Claims, 1 Drawing Sheet

CELL WITH PC AND BAKED GLASS

REFERENCE CELL DISCHARGE; GLASS ONLY

CELL WITH PC AND BAKED GLASS

CELL WITH PC AND UNBAKED GLASS

TEMPORARY BARRIER LAYER IN BATTERIES

BACKGROUND OF THE INVENTION

The invention relates to fluid-activated primary batteries of the reserve type and to a separator system which maintains proper spacing between the positive and negative electrodes and electrically insulates the electrodes from each other.

There are a large number of nonaqueous room temperature or near room temperature battery systems that have been extensively investigated in recent years. Many of these batteries use an alkali metal such as lithium or an alkaline earth metal such as magnesium as the reducing agent at the negative electrode. A few of the systems have been produced on a limited basis for cardiac pacemakers, watches, small electronic devices and special military use. Some are designed for high energy density, high power, short life applications such as power supply for a guidance system in a military weapon. Others are designed for long life and low current drain rates such as are required in a cardiac pacemaker.

This type of battery is often built as a reserve cell for which the electrolyte system is held in reserve by packaging it separately from the cell stack and introducing it into the stack prior to use. Such cells typically comprise a sheet of alkali metal or alkaline earth metal pressed into a nickel screen or grid, a cathode conductor element typically comprising a paste of carbon powder mixed with a tetrafluoroethylene binder spread on a nickel grid, with the anode and cathode elements being separated by an inert porous material such as glass cloth filter paper, which must be permeable to permit passage of electrolyte and soluble products of decomposition of the anode.

Particularly in those applications which require both a high energy density and a high discharge rate, the cell systems must be as thin as possible with an electrode separator system which will provide a high void volume while providing sufficient integrity to eliminate electrical shorting potential between the electrodes. In addition, there is a requirement for rapid battery activation which means that the electrolyte must flow rapidly through the separator under a combination of vacuum in the dry battery stack and external pressure.

The shorting mechanism of concern is the migration, induced by mechanical shock and vibration and static electricity, of the electrically conductive carbon from the cathode conductor element to the anode through the porous separator medium. Thus, key requirements for the glass cloth filter paper separator medium include the need to be very thin, a capacity to sustain abusive handling of the battery without tearing during dry storage and a capacity to enable the battery to become activated upon injection of the electrolyte solution within a time span of less than 5 seconds, and preferably less than 1 second, without producing undesirable by-products that would interfere with the intended electrochemical reactions. While glass cloth separators would appear to satisfy these requirements, undesirable failure rates are in fact encountered in cells using such separators.

An alternative type of separator material comprises a porous, polymeric film, typically on some type of support matrix, which at least permits the passage of ions. While otherwise acceptable as a separator medium, such porous insoluble films are not, according to the patent literature, effective in preventing contact or migration of very fine carbon particles which break or slough from the cathode conductor element and bridge across the void space, through the porosities in the film. Such ionically porous films also present a quality control problem in that if too thick, they inhibit electrolyte effectiveness, and if too thin, may break and allow bridging.

SUMMARY OF THE INVENTION

In accordance with the present invention, there is provided a fluid-activatable reserve primary battery comprising an anode and a cathode and including a temporary separator medium for a fluid-activatable reserve primary battery comprising a substantially impervious polymer film which is substantially completely soluble in the activating electrolyte fluid without detrimentally reacting or interacting with the electrolyte interposed between the anode and the cathode in each individual cell. The film comprises a glassy amorphous hydrophobic polymer having a glass transition temperature above 25° C. and a thickness not greater than 5 microns. It is soluble in a Lewis acid electrolyte solution. The invention further provides methods for maintaining proper spacing between the electrodes of each cell and for preventing electrical contact between the electrodes prior to activation of the battery.

The thin impervious temporary separator medium of the invention is effective in preventing contact between the electrodes, including any bridging between the electrodes by electrode debris during storage and permits the design of thinner individual cells while retaining sufficient void volume for electrolyte solutions.

DESCRIPTION OF THE PREFERRED EMBODIMENTS

Figure 1:
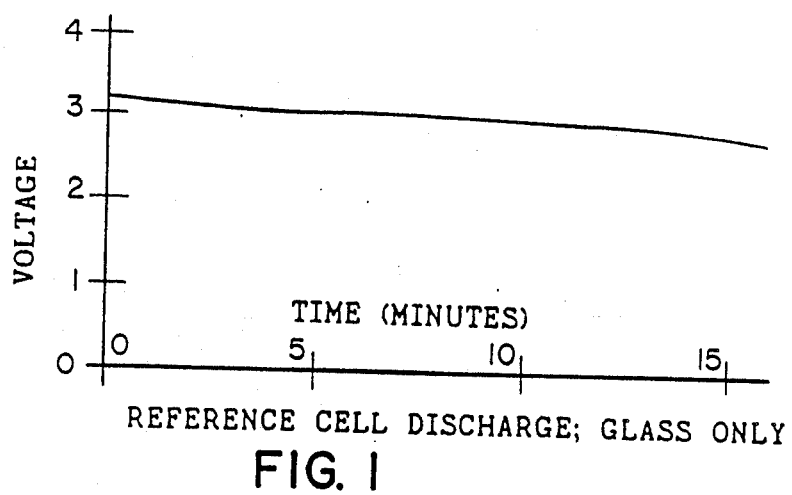
FIG. 1 is the discharge curve chart of a primary reserve cell which is not of the invention.

The temporary separator barrier films of this invention represent a significant departure from polymeric separator films of the prior art. As pointed out in U.S. Pat. No. 4,629,666, separator materials for inorganic electrolyte-alkali metal/alkaline earth metal electrochemical cells must be made of a material that is chemically stable toward both the electrolyte solution and the anode, microporous, flexible, thin and has good mechanical strength.

While the separator barrier layers of this invention are thin, flexible and have good mechanical strength, they differ from prior art separator materials in that they are not porous and, while chemically stable toward the anode, they are soluble in the activating electrolyte fluids but otherwise do not react or interact with the electrolyte fluid in a manner which would detract from cell performance. The impervious characteristic of the invention barrier layers completely insulates the anode from the cathode, prevents any bridging of fine carbon particles (on the order of 1 micron in particle size) between the anode and cathode, permits thinner cell design and reduces sloughing of cathode material and damage to cell components during dry storage. The solubility of the barrier layer in the electrolyte provides rapid activation of the cell. The inertness (other than solubility) of the barrier layers to the electrolyte fluid allows the electrochemical reactions to proceed in the absence of any significant degradation of either electrode material or electrolyte fluid resulting from reaction with the temporary barrier separator layer.

The temporary separator barrier layers of this invention are preferably impervious amorphous glassy Lewis base polymers having a glass transition temperature (Tg) greater than about 25° C. and preferably greater than about 75° C.; a film thickness of less than about 5 microns, preferably less than 2 microns and preferentially in the range of from about 1 to about 2 microns; and which are substantially soluble in Lewis acid electrolyte systems. The films will have a molecular weight which is high enough to provide dimensional stability and mechanical strength but yet low enough that the film is soluble in Lewis acid electrolyte solutions. Extruded or solvent cast polycarbonate films having molecular weights in the range from 15,000 to 200,000 have been found to be particularly effective. Extruded films of molecular weight from about 20,000 to about 60,000 are particularly preferred.

The thin films can be prepared by extruding alternate layers of a film suitable for use in the invention, such as a polycarbonate film having a thickness of 1.5 micron and a support film such as polyethylene. Individual layers of the desired impervious, activating fluid-soluble polycarbonate film are delaminated from the thus formed microlayer sheet as desired. In one instance, the microlayer sheet was 7 mils thick and consisted of 50 alternating layers of coextruded polycarbonate and polyethylene. The polycarbonate film in this instance had a thickness of 1.5 micron.

The temporary barrier separator films are preferably Lewis base polymers, i.e., polymers containing electron donor groups including acyl, oxy, sulfide, carbonyl and nitrile; and which do not contain moieties such as hydroxyl, chloride and activated carbon rings which are reactive with the electrolyte solution so as to degrade electrochemical properties. In addition, the temporary barrier films are preferably hydrophobic in nature, in order to avoid trace water contamination of the cell environment. Water and the alkaline earth and alkali metal anode are highly reactive and can be deleterious to cell performance. For example, water and lithium react to form insoluble lithium hydroxide, which results in a decrease in cell life and electric potential.

Preferred Lewis base polymers include the glassy amorphous hydrophobic polycarbonates and polyesters. The polymers should have a water pickup at 100 percent relative humidity of less than 5 percent, preferably less than 1 percent, by weight. Exemplary polymers include, without limitation thereto, aromatic polycarbonates, ester-carbonate copolymers, polyesters, polyacrylates and polymethacrylates such as polymethyl methacrylate. Currently preferred are films prepared from aromatic polycarbonates.

The Lewis acid activating fluids which are used in the reserve primary batteries with which this invention is concerned are nonaqueous systems. In such systems, an electrolyte such as lithium tetrachloro aluminate, lithium tetrachloro borate or lithium bromide is combined with an oxidizing agent such as sulfuryl chloride, thionyl chloride, sulfur dioxide, phosphoryl chloride or other suitable oxidizing medium in which the polymer material and the electrolyte are soluble. A particularly preferred electrolyte solution with lithium anodes is lithium tetrachloro aluminate dissolved in liquid thionyl chloride.

The positive electrode of the reserve batteries with which the invention is concerned is typically a paste of carbon powder mixed with a polytetrafluoroethylene binder spread on a nickel grid. Other cathodic materials include silver chloride, cupric chloride and iodine.

Lithium is the preferred anodic material because of its low equivalent weight and strong reducing potential. Other anodic materials include magnesium and sodium.

The temporary barrier separator films of this invention are typically interposed between the anode and cathode elements of the reserve primary cell as a free film preferably located between a porous inert separator and the cathode. They may also be applied as a covering layer encapsulating the cathode, sandwiched between a pair of inert porous separator sheets, or as an encapsulant or covering layer for the porous inert separator. The porous inert support separators are typically inert porous fiberglass filter paper.

Batteries assembled from cells containing the temporary barrier separator layers according to the present invention are extremely sturdy and resistant to shock, as well as substantially free of carbon migration between the electrodes, since the electrodes are firmly separated by the impermeable temporary barrier separator layer. Moreover, since the temporary barrier film layers of the invention dissolve substantially immediately when the activating electrolyte is introduced into the individual cells, the full charge may be almost instantaneously drawn from the battery.

Some embodiments of the invention as applied to lithium electrode materials will now be described by way of illustration.

EXAMPLE 1

An extruded polycarbonate film having a thickness of 1.5 microns is used to cover a porous glass fiber sheet. The sandwich is placed between a lithium metal anode and a composite carbon cathode. An electrolyte solution is made by dissolving lithium chloride and aluminum chloride in sufficient thionyl chloride to make a concentration of 1.9M lithium chloride and 2.2M aluminum chloride. The cell is connected to a load and activated by filling the void spaces with the electrolyte liquid. The polycarbonate film dissolves in less than 5 seconds and current flows.

EXAMPLE 2

A series of single lithium/thionyl chloride cells were built and tested. One set of cells was constructed employing two layers of baked glass fiber paper as a separator. The glass paper has a thickness of 5 mils. A second set of cells was constructed employing a 1.5 microns thick pinhole-free bisphenol A polycarbonate temporary barrier layer sandwiched between two layers of baked glass paper, each paper having a thickness of 5 mils. Another set of cells was constructed employing the same polycarbonate film sandwiched between two layers of unbaked glass fiber paper. The cells were discharged at room temperature with a standard resistive load which gives an average current density of 60 milliamps per square centimeter with the reference cell (the cell which does not include a temporary barrier film). A summary of the results are given in Table 1.

TABLE 1

LITHIUM/THIONYL CHLORIDE CELL DISCHARGE TEST SEPARATOR INVESTIGATION

| Cell Type | Run Time* (min.) | Average Voltage | Average Current Density (mA/cm$^2$) | Capacity Amp. hr |
|---|---|---|---|---|
| Reference | 17.7 | 3.06 | 60.4 | 0.407 |
| Reference[a] | 16.3 | 2.97 | 58.7 | 0.364 |
| PC-Baked Glass[b] | 15.8 | 2.99 | 59.1 | 0.355 |
| PC-Baked Glass | 17.2 | 3.04 | 60.1 | 0.392 |
| PC-Unbaked Glass Fiber | 14.9 | 3.05 | 60.3 | 0.341 |
| PC-Unbaked Glass Fiber[c] | 15.1 | 2.99 | 59.2 | 0.340 |

([a]See FIG. 1; [b]See FIG. 2; [c]See FIG. 3)
*Time required for voltage of cell to drop to 2.5 V.D.C.

Figure 2:
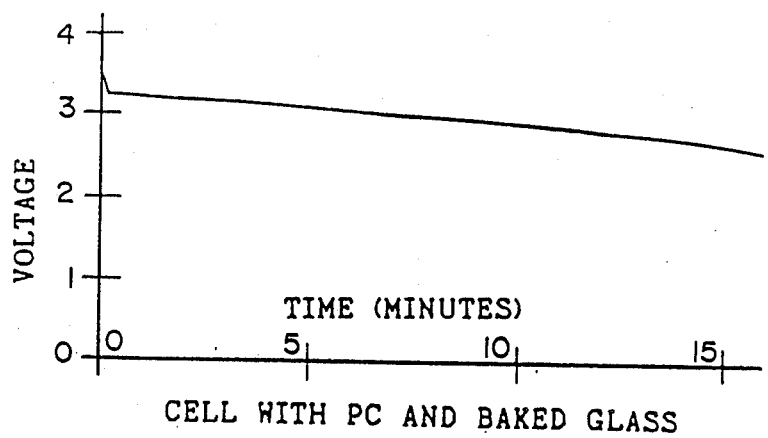
FIG. 2 is the discharge curve chart of a primary reserve cell which is within the scope of the invention.
Figure 3:
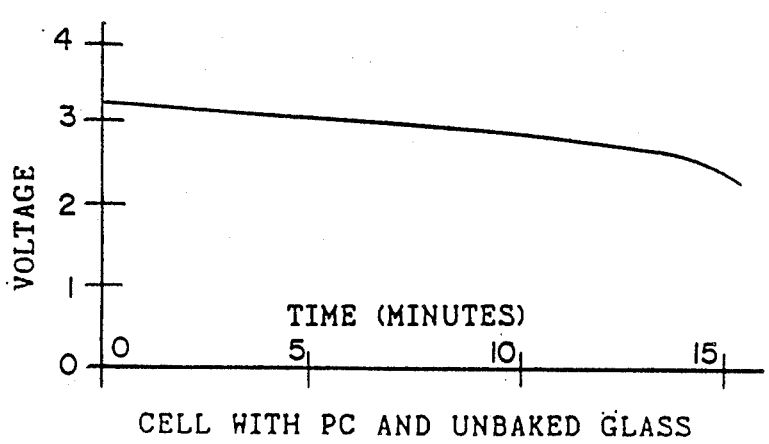
FIG. 3 is the discharge curve chart of another primary reserve cell which is within the scope of the invention. The cell of FIG. 3 differs from that of FIG. 2 in that the inert porous separator of the FIG. 2 cell is baked, whereas the inert porous separator material of the FIG. 3 cell is unbaked.

FIGS. 1, 2 and 3 are discharge curves of one set of the example cells. FIG. 1 is the discharge curve of a reference cell using two layers of baked porous glass paper as the separator, without the temporary barrier separator materials of the invention. FIGS. 2 and 3 are discharge curves of two different cells, identical to the reference cell of FIG. 1, except that the cell employed is 1.5 micron nonpervious film of polycarbonate as a temporary barrier separator material sandwiched between the baked porous glass paper layers and the cell of FIG. 3 employed the 1.5 micron impervious polycarbonate film sandwiched between two layers of unbaked porous glass paper. As can be seen from the Figs., the nonporous film of polycarbonate began to dissolve substantially immediately upon contact with the activating electrolyte. Comparison of the discharge curves of FIGS. 2 and 3 (invention embodiments) with the noninvention cell of FIG. 1 show that the dissolving of the nonporous polycarbonate temporary barrier separator material did not interfere with performance of the activated cell.

The test data shows that the polycarbonate-baked glass combination is essentially identical in performance to the reference design. The substitution of the unbaked glass fiber appears to reduce slightly the run time and thus the capacity. The average voltage and current density remain comparable.

It is understood that the above is merely a preferred embodiment and that various changes and alterations can be made without departing from the spirit and broader aspects of the invention.

The embodiments of the invention in which an exclusive property or privilege is claimed are defined as follows:

1. A fluid-activatable battery comprising an anode and cathode separated by a nonporous film comprising a glassy amorphous hydrophobic polymer having a glass transition temperature above 25° C., a thickness not greater than 5 microns and which is soluble in a Lewis acid electrolyte solution to be added to said battery to activate same.

2. A battery in accordance with claim 1 wherein said film of polymeric material has a thickness in the range from 1 to 2 microns.

3. A battery in accordance with claim 1 wherein said film of polymeric material comprises a Lewis base polymer.

4. A battery in accordance with claim 3 wherein said film of polymeric material is a film of polycarbonates, polyesters, polyacrylates or polymethacrylates.

5. A battery in accordance with claim 3 wherein said film of polymeric material comprises polycarbonate.

6. A battery in accordance with claim 5 wherein said polycarbonate has a molecular weight in the range from 15,000 to 200,000.

7. A battery in accordance with claim 5 wherein said anode comprises lithium and said electrolyte activating fluid comprises thionyl chloride.

8. A battery in accordance with claim 7 wherein said polycarbonate has a molecular weight in the range from 15,000 to 200,000.

9. A battery in accordance with claim 1 wherein said film of polymeric material is adhered to an inert porous support sheet.

10. A battery in accordance with claim 9 wherein said film of polymeric material has a thickness in the range from 1 to 2 microns.

11. A battery in accordance with claim 9 wherein said film of polymeric material comprises a Lewis base polymer.

12. A battery in accordance with claim 11 wherein said film of polymeric material is a film of polycarbonates, polyesters, polyacrylates or polymethacrylates.

13. A battery in accordance with claim 11 wherein said film of polymeric material comprises polycarbonate.

14. A battery in accordance with claim 13 wherein said polycarbonate has a molecular weight in the range from 15,000 to 200,000.

15. A battery in accordance with claim 13 wherein said anode comprises lithium and said electrolyte activating fluid comprises thionyl chloride.

16. A battery in accordance with claim 15 wherein said polycarbonate has a molecular weight in the range from 15,000 to 200,000.

17. A battery in accordance with claim 1 wherein said film of polymeric material is adhered to said cathode.

18. A battery in accordance with claim 17 wherein said film of polymeric material has a thickness in the range from 1 to 2 microns.

19. A battery in accordance with claim 17 wherein said film of polymeric material comprises polycarbonate.

20. A battery in accordance with claim 19 wherein said polycarbonate has a molecular weight in the range from 15,000 to 200,000.

21. A battery in accordance with claim 19 wherein said anode comprises lithium and said electrolyte activating fluid comprises thionyl chloride.

22. A battery in accordance with claim 21 wherein said polycarbonate has a molecular weight in the range from 15,000 to 200,000.

23. A method for preventing contact between the anode and cathode elements of a Lewis acid-activatable primary reserve which comprises interposing between said anode and cathode elements, a nonporous film comprising a glassy amorphous hydrophobic polymer having a glass transition above 25° C., a thickness not greater than 5 microns and which is soluble in Lewis acid electrolyte solution to be added to said battery to activate same.

24. A method in accordance with claim 23 wherein said nonporous film has a thickness of from about 1 to about 2 microns.

25. A method in accordance with claim 23 wherein said nonporous film comprises a Lewis base polymer.

26. A method in accordance with claim 25 wherein said nonporous film is a film of polycarbonate, polyester, polyacrylate or polymethacrylate.

27. A method in accordance with claim 25 wherein said nonporous film comprises polycarbonate.

28. A method in accordance with claim 27 wherein said polycarbonate has a molecular weight in the range from 15,000 to 200,000.

29. A method in accordance with claim 27 wherein said nonporous film is soluble in an electrolyte activating fluid comprising thionyl chloride.

30. A method in accordance with claim 29 wherein said polycarbonate has a molecular weight in the range from 15,000 to 200,000.

31. A method in accordance with claim 23 wherein said nonporous film is applied over an inert porous support member which is interposed between said anode and said cathode.

32. A method in accordance with claim 31 wherein said nonporous film has a thickness in the range from 1 to 2 microns.

33. A method in accordance with claim 31 wherein said nonporous film comprises a Lewis base polymer.

34. A method in accordance with claim 33 wherein said nonporous film comprises polycarbonate, polyester, polyacrylate or polymethacrylate.

35. A method in accordance with claim 33 wherein said nonporous film comprises polycarbonate.

36. A method in accordance with claim 35 wherein said polycarbonate has a molecular weight in the range from 15,000 to 200,000.

37. A method in accordance with claim 35 wherein said anode comprises lithium and said electrolyte activating fluid comprises thionyl chloride.

38. A method in accordance with claim 37 wherein said polycarbonate has a molecular weight in the range from 15,000 to 200,000.

39. A method in accordance with claim 23 wherein said nonporous film is applied over and adhered to said cathode.

40. A method in accordance with claim 39 wherein said nonporous film comprises polycarbonate having a molecular weight in the range from 15,000 to 200,000.

41. A method in accordance with claim 40 wherein said anode comprises lithium and said electrolyte activating fluid comprises thionyl chloride.

* * * * *